United States Patent [19]

Karger

[11] Patent Number: 5,210,874
[45] Date of Patent: May 11, 1993

[54] CROSS-DOMAIN CALL SYSTEM IN A CAPABILITY BASED DIGITAL DATA PROCESSING SYSTEM

[75] Inventor: Paul A. Karger, Acton, Mass.

[73] Assignee: Digital Equipment Corporation, Maynard, Mass.

[21] Appl. No.: 865,699

[22] Filed: Apr. 8, 1992

Related U.S. Application Data

[63] Continuation of Ser. No. 226,381, Jul. 29, 1988, abandoned.

[30] Foreign Application Priority Data

Mar. 22, 1988 [GB] United Kingdom ............... 8806754

[51] Int. Cl.$^5$ ............................................. G06F 9/46
[52] U.S. Cl. .................................. 395/650; 395/725; 364/DIG. 1; 364/280; 364/281.3; 364/281.7; 364/284; 364/286; 364/286.4; 364/286.5
[58] Field of Search ................... 395/650, 700, 725; 364/DIG. 1, DIG. 2

[56] References Cited

U.S. PATENT DOCUMENTS

| | | | |
|---|---|---|---|
| 4,297,743 | 10/1981 | Appell et al. ...................... | 395/650 |
| 4,430,705 | 2/1984 | Cannavino et al. ................. | 395/400 |
| 4,454,579 | 6/1984 | Pilat et al. .......................... | 395/375 |
| 4,455,602 | 6/1984 | Baxter, III et al. ................. | 395/775 |
| 4,484,274 | 11/1984 | Berenbaum et al. ................ | 395/800 |
| 4,486,831 | 12/1984 | Wheatley et al. ................... | 395/650 |
| 4,525,780 | 6/1985 | Bratt et al. .......................... | 395/425 |
| 4,545,012 | 10/1985 | Clancy et al. ....................... | 395/425 |
| 4,584,639 | 4/1986 | Hardy .................................. | 395/650 |
| 4,633,430 | 12/1986 | Cooper ................................ | 364/419 |
| 4,811,208 | 3/1989 | Myers et al. ........................ | 395/800 |
| 4,851,992 | 7/1989 | Nakayama .......................... | 395/200 |
| 4,945,480 | 7/1990 | Clark et al. ......................... | 395/700 |
| 5,023,773 | 6/1991 | Baum et al. ........................ | 395/425 |

OTHER PUBLICATIONS

G. J. Chaitin, "Register Allocation & Spilling Via Graph Coloring", Proceedings of the SIGPLAN '82 Symposium on Compiler Construction, 1982, pp. 98–105.

F. Chow, J. Hennessy, "Register Allocation by Priority-based Coloring", Proceedings of the ACM SIGPLAN '84 Symposium on Compiler Construction, 1984, vol. 10, No. 6, pp. 222–232.

R. Colwell, et al., "Instruction Sets and Beyond: Computers, Complexity, and Controversy", Carnegie-Mellon University, 1985, vol. 18, No. 9, pp. 8–19.

E. Gehringer, R. Colwell, "Fast Object-Oriented Procedure Calls: Lessons from the Intel 432", 1986.

Wall, "Global Register Allocation at Link Time", Proceedings of the SIGPLAN '86 Symposium on Compiler Construction, 1986, vol. 21, No. 7, pp. 1–12.

P. Karger, "Domains, Scheduling, and Message Passing, SCAP Design Note", 1987.

D. Wall, "Register Windows vs. Register Allocation", Proceedings of the SIGPLAN '88 Conference on Programming Language Design and Implementation, 1988, pp. 67–78.

*Primary Examiner*—Paul V. Kulik
*Attorney, Agent, or Firm*—Fish & Richardson

[57] ABSTRACT

A cross-domain call system for use in a digital data processing system includes a cross-domain call stack through which cross-domain transfer information is passed from a calling program in one domain for use in connection with a called program in another domain. When a calling program in one domain needs to call another, called, program in another domain, it pushes information on the cross-domain call stack, including a capability identifying data to be used by the called program and conditions a flag whose condition indicates whether the capability is to be erased on return. During the cross-domain call and return, the digital data processing system saves and clears selected registers when transferring control from the calling program to the called program, and restores the saved registers when transferring control from the called program to the calling program, the restored registers containing values to be used by the calling program after it has resumed control. During the cross-domain return operation, the condition of the flag determines whether the capability is to be cleared.

51 Claims, 11 Drawing Sheets

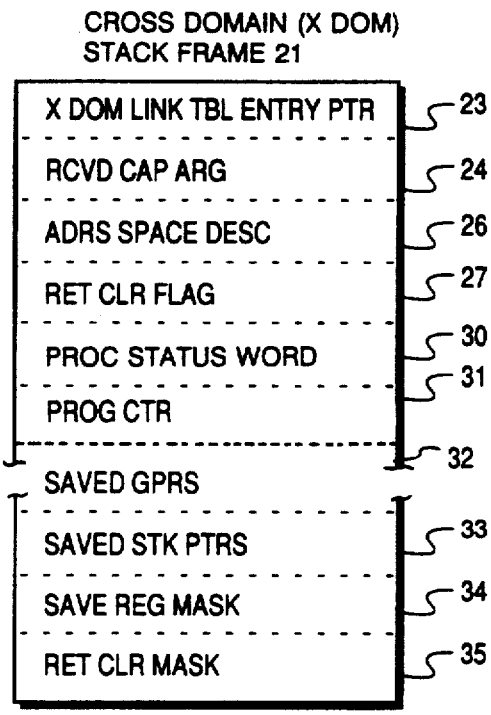
FIG. 3A
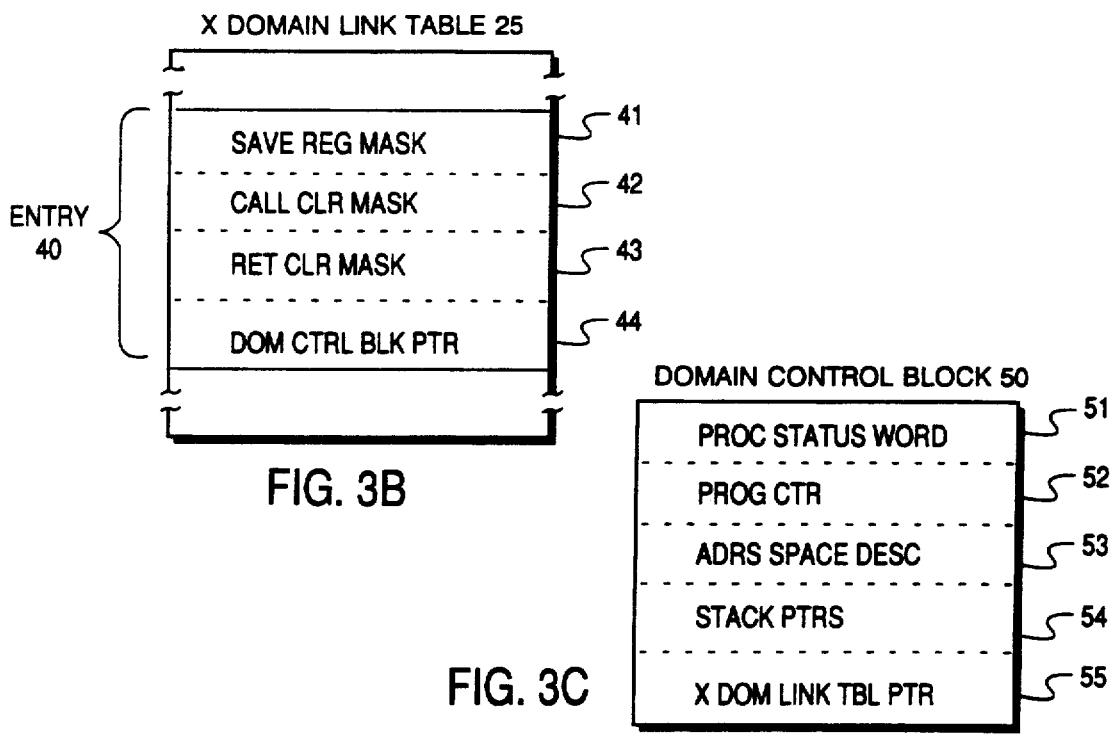
FIG. 3B
FIG. 3C

| REGISTER USAGE | DOES CALLER TRUST CALLEE FOR SECURITY (S) AND INTEGRITY (I) ? | | | |
|---|---|---|---|---|
| | S AND I | S ONLY | I ONLY | NEITHER |
| ARGUMENT REGISTERS <br><br> INPUT ARGUMENTS USED LATER BY CALLER & MODIFIED BY CALLEE | LOADED & SAVED | LOADED & SAVED | LOADED & SAVED | LOADED & SAVED |
| INPUT ARGUMENTS USED LATER BY CALLER AND NOT MODIFIED BY CALLEE | LOADED | LOADED & SAVED | LOADED | LOADED & SAVED |
| INPUT ARGUMENTS NOT USED LATER BY CALLER | LOADED | LOADED | LOADED | LOADED |
| OUTPUT ARGUMENTS | — | — | CLEARED | CLEARED |
| IN/OUT ARGUMENTS | LOADED | LOADED | LOADED | LOADED |
| NON-ARGUMENT REGISTERS <br><br> CALLER USES LATER & MODIFIED BY CALLEE | SAVED | SAVED | SAVED & CLEARED | SAVED & CLEARED |
| CALLER USES LATER & NOT MODIFIED BY CALLEE | — | SAVED | SAVED & CLEARED | SAVED & CLEARED |
| OTHER REGISTERS | — | — | CLEARED | CLEARED |

REGISTER USAGE ON CROSS-DOMAIN CALL

FIG. 4A

| REGISTER USAGE | DOES CALLEE TRUST CALLER FOR SECURITY (S) AND INTEGRITY (I)? | | | |
| --- | --- | --- | --- | --- |
| | S AND I | S ONLY | I ONLY | NEITHER |
| OUTPUT ARGUMENTS<br>IN/OUT ARGUMENTS | LOADED<br>LOADED | LOADED<br>LOADED | LOADED<br>LOADED | LOADED<br>LOADED |
| SAVED BY CALLER | RESTORED | RESTORED | RESTORED | RESTORED |
| NOT SAVED BY CALLER | — | — | CLEARED | CLEARED |

REGISTER USAGE ON CROSS-DOMAIN RETURN

FIG. 4B

CROSS-DOMAIN CALL SYSTEM IN A CAPABILITY BASED DIGITAL DATA PROCESSING SYSTEM

This is a continuation of application Ser. No. 07/226,381, filed Jul. 29, 1988, now abandoned.

BACKGROUND OF THE INVENTION

1. Field of the Invention

The invention relates generally to the field of digital data processing systems, and more specifically to improved mechanisms for establishing protection domains for processes in such systems to permit sharing of such processes, and their data, while at the same time controlling potentially undesirable alteration of the shared processes and data.

2. Description of the Prior Art

A digital data processing system includes three basic elements, namely, a processor element, a memory element and an input/output element. The memory element stores information in addressable storage locations. This information includes data and instructions for processing the data. The processor element fetches information from the memory element, interprets the information as either an instruction or data, processes the data in accordance with the instructions, and returns the processed data to the memory element for storage therein. The input/output element, under control of the processor element, also communicates with the memory element to transfer information, including instructions and data to be processed, to the memory, and to obtain processed data from the memory.

Typically, an input/output element includes a number of diverse types of units, including video display terminals, printers, interfaces to the public telecommunications network, and secondary storage subsystems, including disk and tape storage devices. A video display terminal permits a user to run programs and input data and view processed data. A printer permits a user to obtain a processed data on paper. An interface to the public telecommunications network permits transfer of information over the public telecommunications network.

Since computer systems have been very expensive, they have been designed as multi-user systems to process programs of instructions for several users concurrently to allow the cost of the systems to be divided among a number of users. This provided a number of advantages. For example, in many circumstances, a processor may be waiting for the completion of an operation, such as a transfer of information to or from a disk or tape, before it can continue processing instructions in the program which required the transfer operation. In that case, the processor could process instructions forming portions of another program. In other circumstances, while a processor was waiting for input from an operator of data to be processed by one program, it would process portions of another program until the operator actually makes the input. Control programs, known as operating systems, were developed which facilitated concurrent use by a number of users, using a number of diverse programs, so that the expensive equipment was used as fully as possible.

Multi-user systems also provided a number of other benefits, most notably the sharing of data. Since a number of users were using the same system, they could share the same data. Thus, for example, various workers in a corporate accounting department may perform various data input functions while others may generate reports based on the same data, all at the same time. While the cost of computer systems has recently been reduced with the advent of computer workstations and personal computers, with each user effectively having his or her own computer, the desirability of allowing sharing of data has led to the implementations of networks allowing sharing through file and database servers.

A problem arises since it may be desirable for programs to share only part of the data, and that for only limited purposes. For example, some programs may need to permit others to read data for processing, but not alter it. This occurs, most notably, between the operating system programs and applications programs, since the operating system programs may generate tables which are used by the applications programs during processing; the applications programs must be able to read the tables, but they must be prevented from writing or adulterating the information in the tables or they may interfere with proper operation of the other applications programs which the computer system may be processing at the same time.

Similar problems also arise among applications programs. For example, programs in a computer system providing accounting may need to permit a number of programs to use original data to produce processed data, but to preclude any from altering the original data. If a program in the accounting system does erroneously alter the original data, it may prevent other programs from providing correct processed data.

Thus, protection systems have been developed to regulate the sharing of information, including programs and data, among the programs operating in the system. One typical form of protection provides a series of hierarchical protection layers or rings with varying privilege levels. Programs and their attendant data were allocated to one of the protection rings, with operating system programs being assigned to very high privilege levels and application programs to very low privilege levels. Thus, while the privileged operating system programs could access applications programs, the applications programs could not directly access the operating system programs or data. As a result, applications programs could not adulterate the operating system programs or data.

However, while such protection systems effectively isolate the applications programs from the operating system programs and data, they do not isolate the applications programs from each other. Thus, an applications program may not be able to regulate access by another applications program. More recently, other protection systems provide such regulation by means of "capabilities", in which a program can regulate access by either giving or not giving an access capability to another program. The other program can access the first program only if the first program gives it a capability. Thus, programs can regulate access by other programs by means of capabilities, even if they would otherwise operate at the same privilege level in a protection ring system.

While capability protection systems provide significant protection as among programs which would operate at the same privilege level, they require significant overhead. Each program in the capability system effectively operates in a separate protection domain. When a program operating in one domain needs to call a program operating in another domain, which it can do if it has a capability, the operating system must make a cross-domain call to the domain of the called program. In current capability protection systems, a cross-domain call requires significant processing by the operating system or by the processor's processing hardware to complete. Thus, while capability systems provide much better protection among programs in a digital data processing system, they can slow down processing significantly because of the time required for the cross-domain calls.

Two problems arise in connection with cross-domain calling operations in a capability system. First, a problem arises with ensuring that a capability given by a calling program to one called program is not inadvertently obtained by another program. In a prior capability system, namely the Intel 432, during every cross-domain call, the portions of memory containing capabilities which were being passed as arguments had to be cleared, which significantly increased the time required for a cross-domain call.

A second problem is to minimize the number of the processor's registers which have to be saved or cleared. As is typical, a calling program can pass arguments, that is, variable values, to a called program in registers, and the called program may provide result values in registers. Other registers, that is, those not used to pass variable values or results, may have been used by the calling program for storage of variable values which it used prior to the transfer of control to the called program, and which the calling program may need to use when the called program returns control to it. The called program may not, however, need to use all of the registers for its processing, and it would be extra, perhaps unnecessary, effort to save the contents all of these registers in memory if only some of the registers are to be used by the called program.

A further complication arises in connection with the saving of registers relating to the "trustworthiness" of the called program as perceived by the calling program. Trustworthiness includes two aspects, namely, whether the calling program (or actually the programmer) "trusts" the called program not to release information to other programs, which s a question of security of, the information provided to the called program, and whether it trusts the called program not to modify or sabotage the data made available to the called program. Similar problems also arise in connection with the trustworthiness of the calling program as perceived by the called program.

SUMMARY OF THE INVENTION

The invention provides a new and improved digital data processing system including a capability protection system which has a new cross-domain call mechanism which significantly reduces the overhead required for cross-domain calls.

In brief summary, the new cross-domain call system includes a cross-domain call stack through which cross-domain transfer information is passed from a calling program for use in connection with a called program. When a calling program in one domain needs to call another, called, program in another domain, it pushes information on the cross-domain call stack, including a capability identifying data to be used by the called program and a flag whose condition indicates whether the capability is to be erased on return. During the cross-domain call and return, the digital data processing system saves registers whose contents are to be saved when transferring control from the calling program to the called program, and restores them when transferring control from the called program to the calling program, the restored registers containing values to be used by the calling program after it has resumed control.

The new system thus saves and restores only the minimum number of registers required by the calling and called programs, rather than all registers as in previous cross-domain call systems.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 3A through 3C are block diagrams depicting data structures used in the system depicted in FIG. 1;

FIGS. 4A and 4B are tables which are useful in understanding the invention;

DETAILED DESCRIPTION OF AN ILLUSTRATIVE EMBODIMENT

Figure 1:
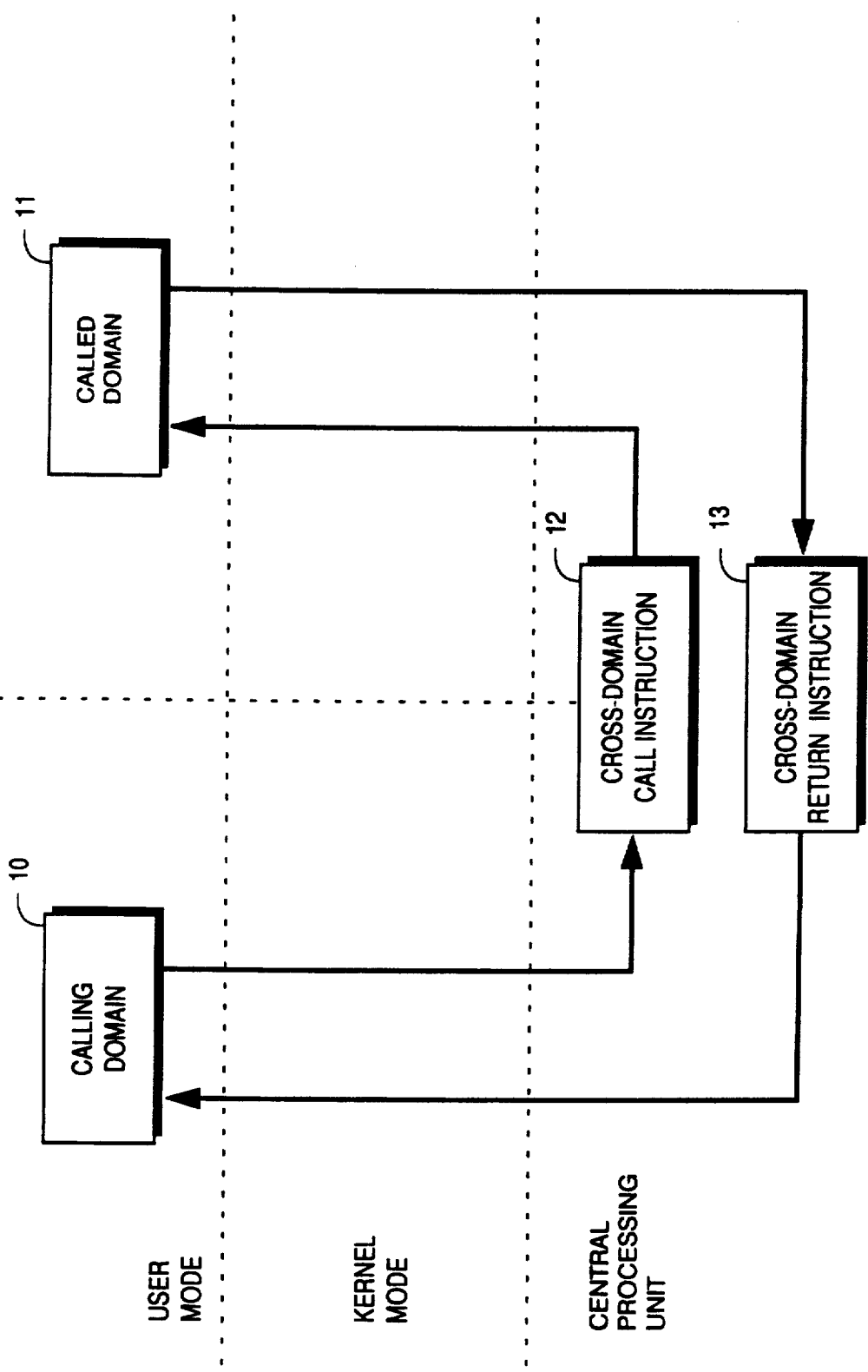
FIG. 1 is a general block diagram of a digital data processing system in accordance with the invention.

FIG. 1 depicts a system in accordance with the invention which provides a mechanism for efficiently transferring control from a calling program to a called program in a digital data processing system which uses capability protection. By way of background, in the digital data processing system, each of the programs operates in a different virtual address space, and the calling program may, in initiating the call, pass a capability which identifies locations in its address space which contain data to be used by the called program during its processing, or in which the called program is to put processed data. In the call operation, the digital data processing system's operating system initiates an address space change to enable the central processor unit to perform virtual-to-physical address translations for the address space of the called program. Data may also be passed between the calling and called programs in the central processor unit's registers. The data used by the called program, whether passed in the registers or by way of a capability, comprise input arguments, and the processed data returned by the called program comprise output arguments. After processing, the calling program may, through the operating system, return control to the called program, which also requires an address space change to enable the central processor unit to perform virtual-to-physical address translations for the address space of the calling program.

By way of further background, the digital data processing system, and particularly the central processor unit described here, operates in one or more protection rings or layers, identified here as operating modes. If the central processor unit operates in two or more operating modes, the modes form a hierarchical protection system. Two operating modes are identified here, namely a user mode, in which applications programs, such as the calling and called programs, are processed, and a kernel mode, in which at least the most privileged portions of the operating system are processed. Central processor units may also permit operation in other operating modes than the user mode and the kernel mode; in one embodiment, used in connection with central processor units constructed in accordance with the VAX-11 architecture defined by Digital Equipment Corporation, assignee of this application, the central processor units operate in four operating modes, namely, the kernel, executive, supervisor and user operating modes.

With this background, the invention provides a mechanism for use in a digital data processing system for enabling a program operating in a calling domain to call a program operating in a called domain, and for enabling the program operating in the called domain to return control to the program operating in the calling domain. Two embodiments of the invention are described. In one embodiment, which is described in connection with FIGS. 1 through 5B, the cross-domain call and return operations are initiated in response to processor instructions therefor which are executed by the processor hardware, which generally will be implemented in microcode. In a second embodiment, which is described in connection with FIGS. 6 through 7B, the operations which are required to implement the cross-domain call and return operations are all enabled by routines which form part of the operating system and which may be typically executed by the processor operating in the kernel mode.

With reference to FIG. 1, the digital data processing system operates in two hierarchical protection modes, namely a user mode and a kernel mode. To accomplish the call operation, a program operating in the calling domain 10 the first loads input arguments into processor registers (not shown) and/or into buffers in its address space in memory (also not shown). If the program has loaded arguments into buffers in its address space, to pass the buffered arguments it then issues a PASSARG (pass argument) instruction which enables the central processor unit hardware to trap to the operating system to load a capability identifying the buffers containing input arguments in a global cross-domain stack (C-stack) 20 (described below in connection with FIG. 2B and 3A). The capability is an operand of the PASSARG pass argument instruction.

The program operating in the calling domain 10 then issues a cross-domain call instruction 12, which includes as an operand a pointer to an entry in a cross-domain linkage table 25 (described below in connection with FIG. 3B). The central processor unit hardware then saves at least a portion of the context of the program operating in the calling domain in the cross-domain stack 20. Using the identified entry in the cross-domain linkage table and a domain control block 50 (described below in connection with FIG. 3C), the central processor unit hardware establishes the context for the program in the called domain 11 and passes control to that program.

The program in the called domain 11 has immediate access to the arguments passed in the processor registers. However, to obtain access to the arguments passed in the buffers, the program issues a MAPARG map argument instruction. In executing the MAPARG map argument instruction, the central processor unit hardware traps to the operating system to extract the capability from the cross-domain stack 20 and map the buffers identified thereby into the address space of the called domain 11.

After processing, the program operating in the called domain 11 returns control to the program operating in the calling domain 10. To accomplish this, the program operating in the called domain 11 issues a cross-domain return instruction 13. In response, the central processor unit hardware re-establishes, from the context saved in the cross-domain stack, the context of the program in the calling domain 10 and returns control to that program.

Figure 2A:
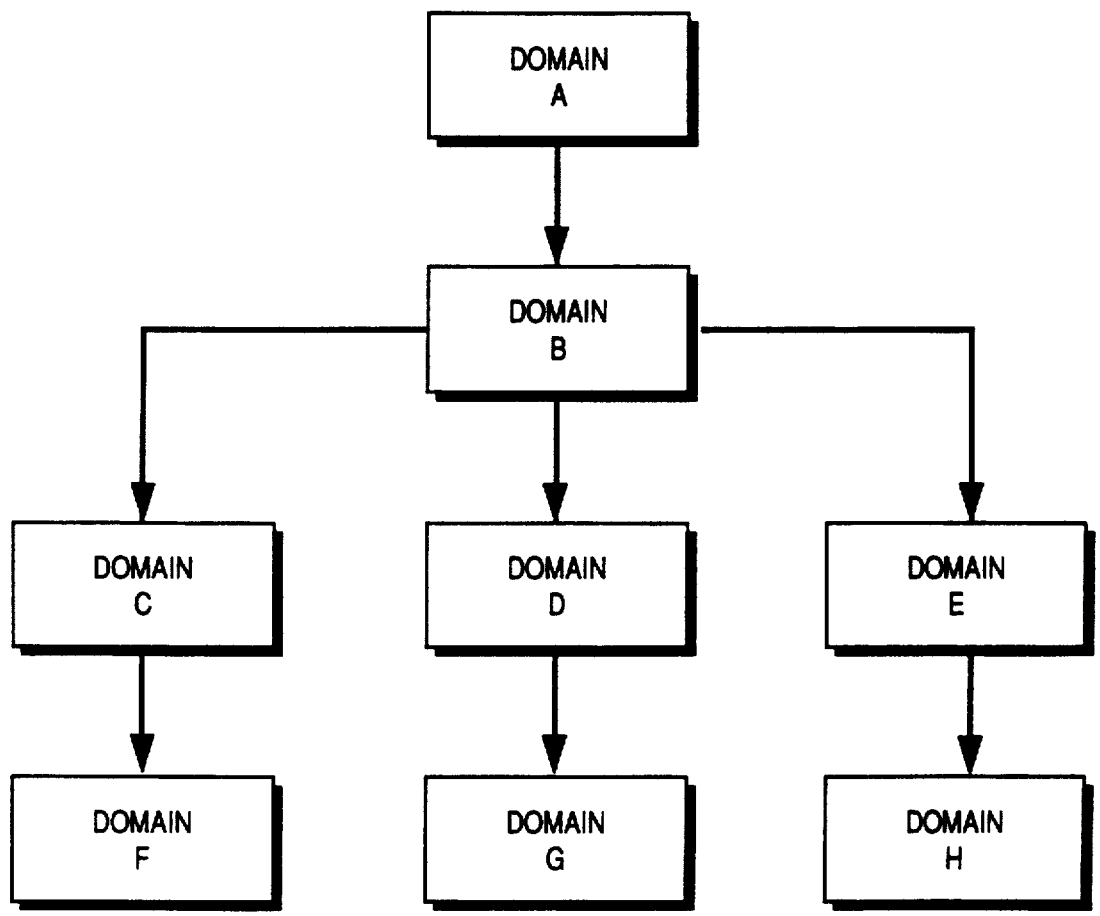
FIGS. 2A and 2B are general block diagrams depicting various structures used in the digital data processing system depicted in FIG. 1.

During processing of a program in the called domain, the program may call programs in other domains, which, in turn, may call programs in still other domains. This is depicted in FIG. 2A. With reference to FIG. 2A, a program in domain A is shown as calling a program in domain B. A program in domain B, in turn, is depicted as calling, iteratively, programs in domains C, D and E, before returning to domain A. Similarly, the programs in domains C, D and E may call programs in other domains, identified as domains F, G and H, before returning control to a program in domain B. A program in any of the domains A through H may also call programs in other domains which are not shown in the Fig. Furthermore, it will be appreciated that a program in another domain (not shown) may call programs in domain A to initiate the processing in the domains depicted in the Fig. In transferring control from a program in each calling domain to a program in a called domain, the facilities described above in connection with FIG. 1 are used during the control transfer In performing the control transfer, the central processor unit, and particularly the operating system, uses the global cross-domain stack (C-stack) 20, which is a data structure generally depicted in FIG. 2B. The cross-domain stack 20 includes a plurality of stack frames 21A through 21D (generally identified by reference numeral 21), each of which is used to receive information, as described below in connection with FIG. 3A, used by the calling program which is to be saved during a cross-domain call operation. Frame 21A in the cross-domain stack 20 is established when a program in domain A calls a program in domain B.

In the cross-domain call operation in which a program in domain A calls a program in domain B, certain information which the program in domain A needs to have saved, that is, which it will use after the return operation, is stored in cross-domain stack frame 21A. Information which the program in domain A passes to the program in domain B, most notably a capability identifying locations in domain's address space which may contain data to be used by the called program during processing, or which the called program in domain B may use to store processed information, is stored in the cross-domain stack frame 21B during the cross-domain call operation.

Similarly, cross-domain stack frame 21B is used for storing information which a calling program in domain B needs to have saved for use after a return when it calls a program in domain C, domain D or domain E, and the calling program passes information for use by the called program in cross-domain stack frame 21C. Since the called program in, for example, domain C, returns control to the calling program in domain B before control is transferred to a program in domain D, the same cross-domain stack frame 21C will be used for transfers to domains C, D and E.

In addition, when a calling program in domain C, D or E calls a program in, respectively, domain F, G or H, the information to be saved for the calling program is stored in cross-domain stack frame 21C and the information to be provided to the called program is stored in cross-domain stack frame 21D.

FIG. 3A depicts the details of a cross-domain stack frame 21. With reference to FIG. 3A, a cross-domain stack frame 21 includes a number of fields, including a cross-domain link table entry pointer field 23 and a received capability argument field 24. The received capability argument field 24 contains the capability loaded during execution of the PASSARG pass argument instruction issued prior to the cross-domain call operation. The cross-domain link table entry pointer field 23 contains a pointer to an entry in a cross-domain link table 25, which is described below in connection with FIG. 3B. The pointer is obtained from a domain control block 50 (described below in connection with FIG. 3C) of the current domain (that is, the calling domain 10) when the current domain was itself called. In brief, the entry in the cross-domain link table 25 contains masks which identify registers in the central processor unit whose contents are to be saved and cleared during a cross-domain call operation, and those registers whose contents are to be cleared on return.

The received capability argument field 24 in the cross-domain stack frame 21 contains either capability or a pointer to a set of capabilities. Briefly, a capability identifies a buffer in the calling program's virtual address space which contains data to be used by the called program, or in which the called program is to store processed data for return to the calling program. In one embodiment of the invention which is in a digital data processing system in which the virtual address space is divided into a plurality of pages, the capability identifies a range of pages in the virtual memory. Alternatively, if the address space is divided into segments, the capability may identify a variable-length portion of physical storage. The capability also identifies the access rights by which the called program can access the page, that is, for example, whether it can read the contents of the locations in the page, write the locations in the page, or both.

The received capability argument field 24 may alternatively contain a pointer to a page containing a plurality of capabilities. This may occur, for example, if the calling program needs to pass or receive data in non-contiguous portions of its virtual address space to the called program, or pass various portions with varying access rights.

Other fields of the cross-domain stack frame 21 contain context information relative to the calling program during execution of the a cross-domain call instruction 12. Fields 26 and 30 through 33 of the cross-domain stack frame 21 receive the contents of a number of central processor unit registers containing context information for the calling program at the beginning of the cross-domain call operation. Other fields, namely fields 34 and 35, receive masks which identify registers which were saved during the call operation and are to be cleared during a return operation. Finally, the cross-domain call stack frame 21 includes a return clear flag field 27 which will be described below.

More specifically, the fields in the cross-domain stack frame 21 which store the calling program's context information include an address space descriptor field 26 which receives a descriptor for the virtual address translation table for the calling program. The descriptor identifies the base addresses and lengths of the tables which are used in performing virtual-to-physical translation of the calling program's virtual addresses. A processor status word field 30 receives the contents of the processor status word of the central processor unit and a program counter field 31 receives the contents of the program counter register, which identifies the address of the next instruction in the calling program t be processed after the return. A field 32 receives the contents of the central processor unit's general purpose registers which are saved during the cross-domain call operation. Field 32 has sufficient space for all of the general purpose registers, but the contents of only selected general purpose registers are saved. Similarly, a field 33 receives the contents of various registers which are used as stack pointers. In a central processor unit in one digital data processing system including the invention, each program operates in the context of a stack for each of the operating modes, and during a cross-domain call operation the registers which contain pointers for each of these stacks are saved in field 33.

As described above, fields 34 and 35 contain register masks, in particular, a save register mask and a return clear mask, respectively. The save register mask in field 34 identifies the central processor unit's general purpose registers whose contents have been saved in field 32, and the return clear mask in field 35 identifies the central processor unit's general purpose registers which are to be cleared during a cross-domain return operation. Each mask includes a plurality of bits, with each bit being associated with each of the central processor unit's general purpose registers. If a bit in the save register mask in field 34 associated with a register is set, the register's contents have been saved in field 32. On the other hand, if the bit in the mask in field 34 associated with a register is clear, the register's contents have not been saved in field 32. Similarly, if a bit associated with a register in return clear mask 35 is set, it is to be cleared during a cross-domain return operation, but if the bit is clear the associated register will not be cleared.

It will be appreciated that, if the contents of a general purpose register are saved in field 32, it will be restored during a cross-domain return operation. Thus, a register in the general purpose registers whose contents have been saved during a cross-domain call operation, and thus will be restored during a cross-domain return operation, need not be cleared during the cross-domain return operation, and thus a bit associated with a general purpose register will not be set in both the save register mask 34 and the return clear mask 35.

As described above, each cross-domain stack frame 21 also includes a return clear flag 27 whose contents indicate operations to be performed in connection with the capability passed in the capability argument field 24 in the next cross-domain stack frame 21 during the cross-domain return operation. More specifically, when a program operating in a calling domain 10, for example in domain B, calls a program in domains C, D or E, for example, the information is loaded into the various fields 26 and 30 through 35 of cross-domain stack frame 21B, and in fields 23 and 24 of cross-domain stack frame 21C. In addition, the return clear flag 27 in cross-domain stack frame 21B is conditioned to be either set or cleared. If the return clear flag 27 in cross-domain stack frame 21B is set, when the program operating in domain B returns to a program operating in domain A, the contents of the capability argument field 24 in the cross-domain stack frame 21C are cleared, thereby effectively erasing the capability, or capability pointer if the contents of field 24 points to a set of capabilities, which was passed by the calling program to the called program. On the other hand, if the return clear flag 27 in cross-domain stack frame 21B is clear, during a cross-domain return operation to a program operating in domain A, the contents of capability argument field 24 in frame 21C are not erased during the cross-domain return operation.

It will be appreciated that the return clear flag 27 need only be conditioned if the program operating in a calling domain 10 passes a capability to a program operating in a called domain 11. Initially, the return clear flag 27 is in the clear condition. The return clear flag 27 is conditioned during execution of the PASSARG pass argument instruction issued by the program in the calling domain 10 prior to the issuance of the cross-domain call instruction 12. Thus, if a program in a calling domain B passes no capabilities to programs in domains C, D or E, the PASSARG pass argument instruction is not issued and so the condition of the return clear flag of its cross-domain stack frame 21B is not changed. Accordingly, when the program in domain B returns to a program in domain A, no clearing operation is performed in connection with received capability argument field 24 of cross-domain stack frame 21C.

On the other hand, if the program in the calling domain B passes a capability to, for example, a program operating in domain C, it issues the PASSARG pass argument instruction whose operand comprises the capability to be passed. During execution of the PASSARG pass argument instruction, the return clear flag 27 in cross-domain stack frame 21B is set. This operation is performed whenever the program in a calling domain 10 passes a capability to a program in a called domain 11. Thus, if the return clear flag 27 in cross-domain stack frame 21B is set when the program operating in domain B returns to a program operating in domain A, the received capability argument field 24 in cross-domain stack frame 21C is cleared.

However, if, after passing a capability to a called program operating, for example, in domain C, the program operating in domain B calls a program in a called domain D but does not pass a capability, the program operating in domain B issues the PASSARG pass argument instruction, but with a null operand. In executing the PASSARG pass argument instruction with a null operand, the received capability argument field 24 in cross-domain stack frame 21C is cleared to ensure that the program in domain D does not access the portion of the address space identified thereby. In addition, the return clear flag 27 in cross-domain stack frame 21B is cleared. If the program operating in domain B thereafter returns to a program operating in domain A, since the return clear flag 27 in cross-domain stack frame 21B is clear, the received capability argument field 24 in stack frame 21C is not then cleared.

It will be appreciated that this arrangement efficiently provides security for the capability passed in the received capability argument field 24, ensuring that a capability is only used by the program in the called domain 11 for which it is intended. If no capability is ever passed by a program operating in a calling domain 10, the calling program never issues the PASSARG pass argument instruction. As a result, the received capability argument field 24 of the cross-domain stack frame 21 associated with the called domain 11 is never loaded, and so the return clear flag 27 of the cross-domain stack frame 21 associated with the calling domain 11 need not be conditioned to enable the received capability argument field to be cleared.

On the other hand, if a program in a calling domain 10 makes iterative calls to programs in called domains 11 in which capabilities are passed, the capabilities will all be passed in the same received capability argument field 24 in the cross-domain stack frame 21 associated with the called domains. When that occurs, the capability associated with each call overwrites the capability associated with the previous call, and so the previous capabilities are not available to the program operating in the called domain 11. In addition, since the return clear flag 24 in the cross-domain stack frame 21 associated with the calling domain is set, when the program in the calling domain 10 returns, the capability associated with the last call is cleared and are thus not available to other programs..

Finally, when a program in a calling domain 10 makes a call to a program in a called domain 11 in which no capability is passed, after making a call to a program in a called domain during which a capability is passed, the previously-passed capability is cleared during execution of the PASSARG pass argument instruction with the null operand, and is thus not available to the program in the called domain 11. In addition, since the previously passed capability has been cleared, no clearing operation is necessary when the program in the calling domain 10 returns, and so the return clear flag 27 of the cross-domain stack frame 21 associated with the calling domain is cleared. It will be appreciated, however, that if the program in the calling domain 10, before returning, makes a call to a program in a called domain 11 during which a capability is passed, the return clear flag 27 in the cross-domain stack frame 21 associated with the calling domain is set, so that during a return from that domain the capability is cleared.

As described above, the cross-domain link table entry pointer in field 23 in cross-domain stack frame 21 points to an entry 40 in cross-domain link table 25, which is depicted in detail in FIG. 3B. With reference to FIG. 3B, a cross-domain table entry 40 includes three masks in fields 41, 42 and 43, and a pointer to a domain control block in a field 44. Field 41 in the entry 40 contains a save register mask, which identifies the general purpose registers in the central processor unit to be saved upon initiation of the cross-domain call operation. Field 42 contains a call clear mask, which identifies the general purpose registers in the central processor unit to be cleared during the cross-domain call operation. Finally, field 43 contains a return clear mask which identifies the general purpose registers in the central processor unit to be cleared during the cross-domain return operation, in which the called program on one domain returns control to the calling program in another domain.

All of the masks in fields 41, 42 and 43 in an entry 40 in the cross-domain link table 25 contain a plurality of bits, each associated with a register in the general purpose registers. If the bit associated with a register is set, the indicated operation is performed on the register, otherwise it is not. That is, as described above, if a bit associated with a register in the save register mask in field 41 or the return clear mask in field 43 is set, the register's contents are, respectively saved during the cross-domain call operation (and thus restored during the cross-domain return operation), or cleared during the cross-domain return operation. Similarly, if a bit associated with a register in the call clear mask in field 42 is set, the register is cleared during the cross-domain call operation.

Figure 2B:
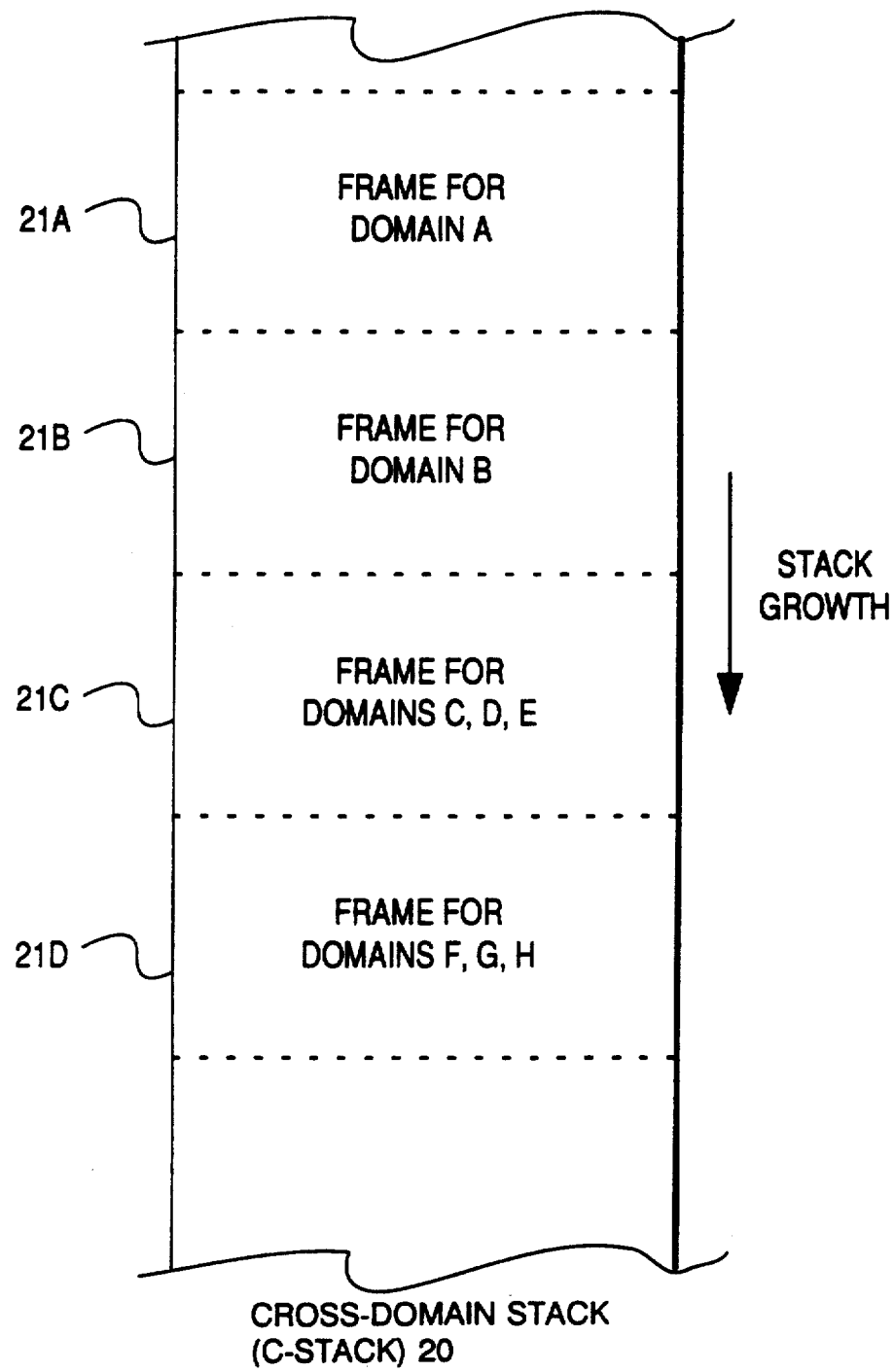

It will be appreciated that, during the cross-domain call operation, the save register mask in field 41 and the return clear mask in field 43 are copied into fields 34 and 35 (FIG. 3A) of the cross-domain stack frame 21 associated with the calling domain. That is, for example, if a program in domain B (FIG. 2A) calls a program in domains C, D or E, the masks in fields 41 and 43 are copied into fields 34 and 35 of the cross-domain stack frame 21B (FIG. 2B). Thus, the masks are available in the cross-domain stack frame 21 for use during the cross-domain return, operation as described above, without having to refer to masks in fields 41 and 43 in the entry 40 in the cross-domain link table 25. The call clear mask in field 42 is not used during the cross-domain return operation, and thus is not saved in the cross-domain stack frame 21.

The particular registers to be saved, cleared and re-stored depends upon a number of factors. One factor is the degree of trust between the calling program and the called program. The degree of trust, in turn, relates to two addition factors, namely whether the calling program trusts the called program for security and for integrity relates to the question of whether the calling program trusts the called program not to release the arguments to another program. On the other hand, integrity relates to the question of whether the calling program trusts the called program not to modify or sabotage the arguments made available to the called program. The degree of trust for security and integrity are determined by the operator, programmer, or a security officer.

A second factor in the selection of the registers to be saved, cleared and restored is whether the registers are to be used to pass arguments between the calling and the called programs. Generally, since the calling program may pass input arguments, that is, data to be processed in selected registers in the general purpose registers, those registers must not be cleared during the cross-domain call operation after they have been loaded by the calling program. They may, however, need to be saved.

Similarly, since the called program may pass output arguments, that is, processed data, in selected registers in the general purpose registers, those registers cannot be cleared or restored during the cross-domain return operation after they have been loaded by the called program, otherwise the output arguments will be overwritten. They may, however, need to be cleared during the cross-domain call operation. In connection with the other general purpose registers, the question of which registers to save and/or clear during the cross-domain call operation depends upon the degree of trust between the calling program and the called program. FIGS. 4A and 4B depict tables which identify the registers to be saved, restored and cleared during the cross-domain call and return operation, respectively, based on whether the calling program trusts the called program for security and/or integrity. In addition, the tables identify the registers which are loaded by the calling program (identified as the "Caller" in FIGS. 4A and 4B) during a cross-domain call operation, and those which are loaded by the called program (identified as the "Callee" in FIGS. 4A and 4B) during a cross-domain return operation.

As described above, an entry 40 in the cross-domain link table 25 also includes a domain control block pointer field 44, which points to a domain control block 50, which is depicted in FIG. 3C. The contents of the domain control block 50 generally are used in establishing the context of the program in the called domain 11 during the cross-domain call operation. With reference to FIG. 3C, the domain control block 50 includes a plurality of fields whose contents are loaded into various registers in the central processor unit as the entry is made to the called program. In particular, the domain control block 50 includes a field 51 which contains the processor status word to be loaded into the central processor unit's processor status register which is to be used as the processor status word for the called program. Similarly, a field 52 contains a value to be loaded into the central processor unit's program counter register to identify address of the first instruction in the called program to be fetched for processing.

The domain control block 50 also includes a field 53 which contains one or more address space descriptors for the address space of the called domain. That is, field 53 contains the address of the base of one or more tables which contain virtual-to-physical address translation, and a value identifying the length of the table. Additionally, a field 54 contains values to be loaded into the various stack pointer registers in the central processor unit.

It will be appreciated that the processor status word in field 51, the program counter value in field 52, the address space descriptor in field 53 and the stack pointers in field 54 are, during the cross-domain call operation, loaded into the same registers in the central processor unit from which the contents are obtained that are stored in fields 30, 31, 26 and 33, respectively, in the cross-domain stack frame 21 of the calling program.

In addition, the domain control block 50 contains a cross-domain link table pointer in a field 55. The cross-domain link table pointer points to a cross-domain link table 25 (FIG. 3B) which is used if a program in the called domain needs to call a program in yet another domain. The particular entry 40 in the cross-domain link table 25 which is to be used by the called program in that case is identified by the cross-domain link table entry pointer in field 23 in the cross-domain stack frame 21 (FIG. 3A).

Figure 5A:
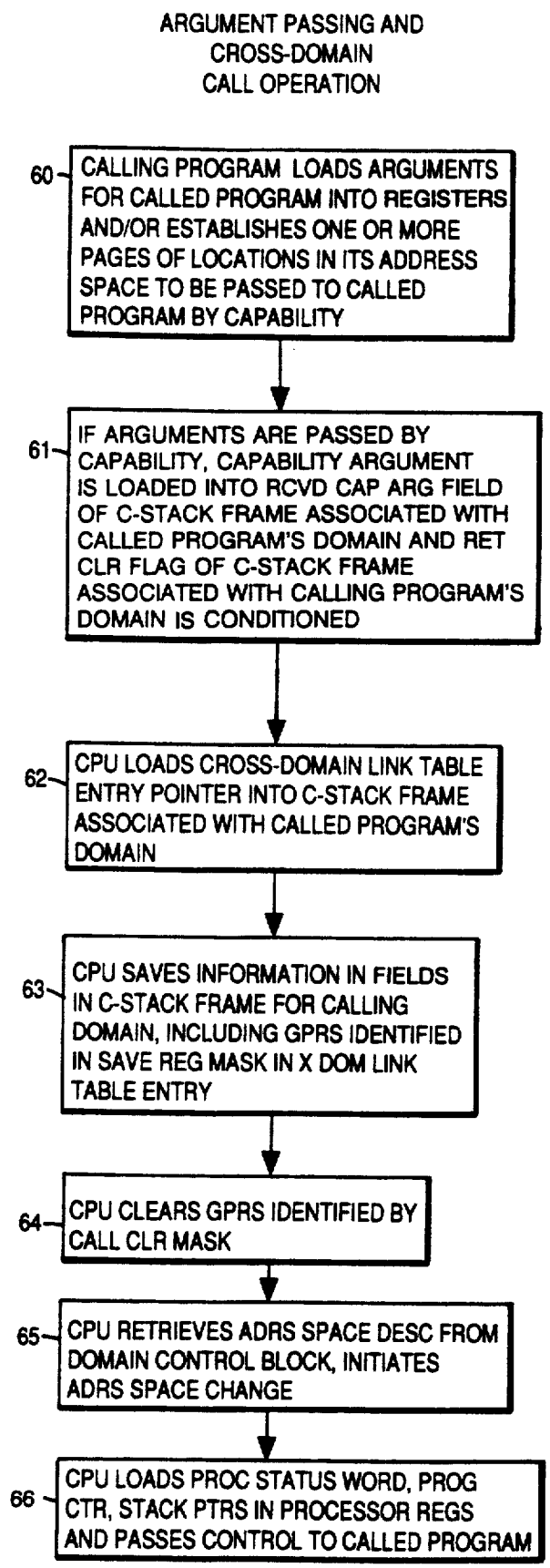
FIGS. 5A and 5B are flow diagrams depicting the operations of the digital data processing system depicted in FIG. 1.

With this background the operations performed during a cross-domain call operation will be described in connection with FIG. 5A and the operations performed during a cross-domain return operation will be described in connection with FIG. 5B. With reference to FIG. 5A, the calling program first loads the arguments to be used by the called program into the central processor unit's general purpose registers and/or into one or more pages in its virtual address space. Thereafter, if arguments are being passed through pages in the calling program's virtual address space, a capability, or a capability pointer identifying a set of capabilities, is generated to identify these pages (step 60). The program in the calling domain then issues the PASSARG pass argument instruction to load the capability or capability pointer into the received capability argument field 24 in the cross-domain stack frame 21 associated with the domain 11 of the called program and establish the condition of the return clear flag in field 27 in the cross-domain stack frame 21 associated with its domain (step 61). The calling program then issues the cross-domain call instruction 12, with operand comprising the cross-domain link table entry pointer.

In executing the cross-domain call instruction, the central processor unit loads the cross-domain link table entry pointer in field 23 in the cross-domain stack frame 21 associated with the domain 11 of the called program (step 62). The cross-domain link table entry pointer identifies an entry in the cross-domain link table 25 to be used in subsequent operations. Following step 62, the central processor unit saves the contents of the processor status register, program counter register, and the stack pointers in fields 30, 31 and 33 in the cross-domain stack frame 21 associated with the calling program's domain 10 (step 63).

The central processor unit also uses the cross-domain table entry pointer in the cross-domain stack frame 21 associated with the called program's domain 11 to obtain the save register mask, call clear mask and return clear mask from fields 41, 42 and 43 of the cross-domain link table entry identified thereby. The central processor unit saves the general purpose registers identified by the save register mask in field 32, and the save register mask itself in field 34, both in the cross-domain stack frame 21 associated with the calling program's domain 10. In addition, the central processor unit saves the return clear mask from field 43 of the entry 40 in the cross-domain link table 25 in field 43 in the cross-domain stack frame 21 associated with the calling program's domain. Thereafter, the central processor unit clears the general purpose registers which are identified by the call clear mask in field 43 of the entry 40 in the cross-domain link table 25 (step 64).

The central processor unit then enables an address space change between the address space of the domain 10 of the calling program and the address space of the domain 11 of the called program. The central processor unit saves the address descriptor for the calling program's domain 10 in field 26 of its cross-domain stack frame 21. The central processor unit then retrieves the address space descriptor from field 53 (FIG. 3C) of the domain control block identified by the domain control block pointer in field 44 of the entry 40 in the cross-domain link table 25 and enables the address change operation (step 65). In one central processor unit, the values in the descriptor are loaded into corresponding processor registers and the contents of a translation buffer which operates as a cache for translation table entries are invalidated in a known manner.

The central processor unit (in step 66) loads the processor status register, program counter register and stack pointer registers in the central processor unit with values from fields 51, 52, and 54 in the domain control block 50 from which the address space descriptor was obtained in step 65. The central processor unit then passes control to the called program in the domain 11. It will be appreciated that, in order for the called program to make use of the locations identified by the capability or capabilities passed to it by the calling program in the received capability argument field 24 in the cross-domain stack frame 21 associated with its domain 11, it must first enable the operating system to map these locations into its virtual address space in a conventional manner using the MAPARG map argument instruction.

Figure 5B:
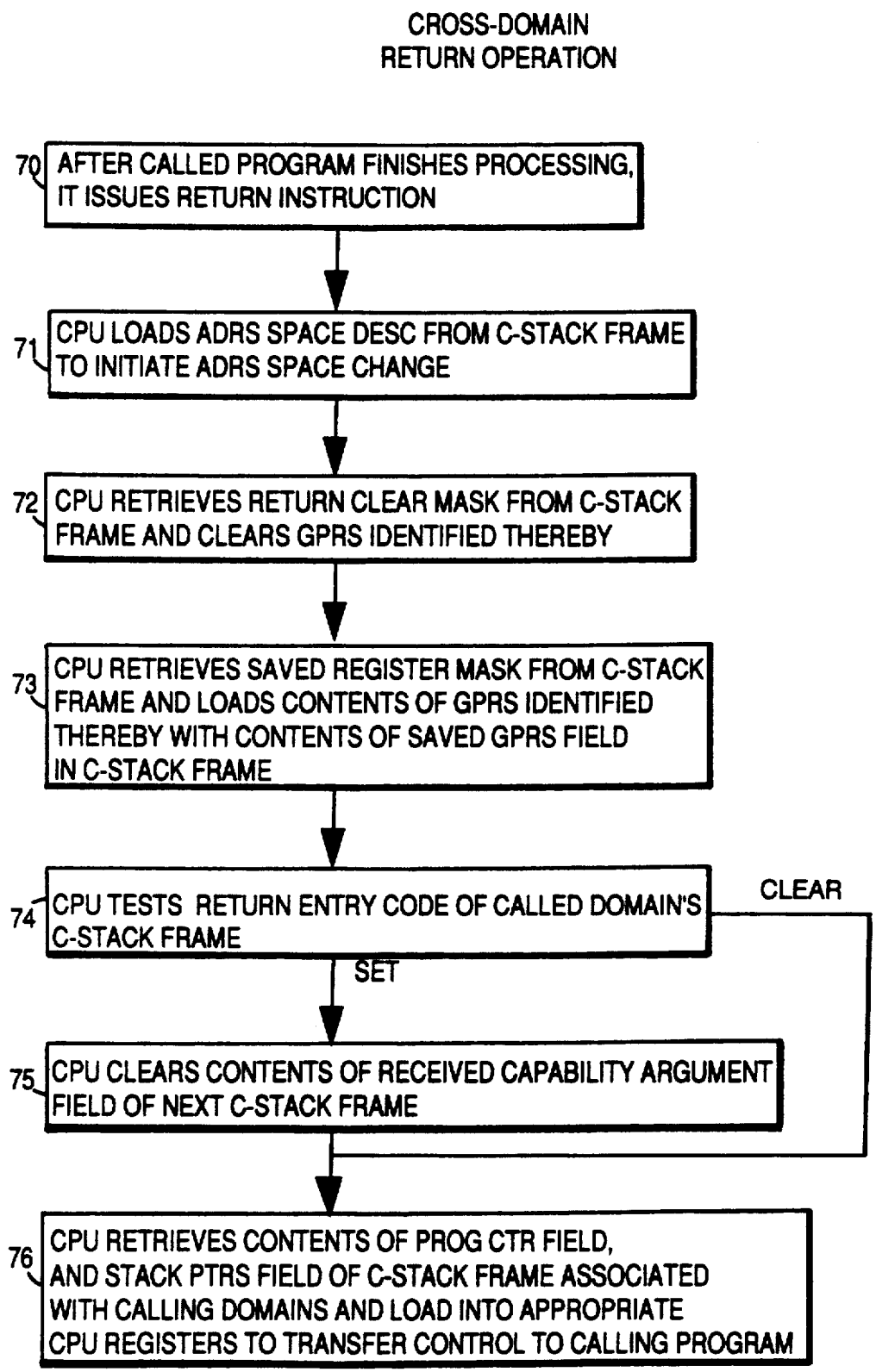

The details of the cross-domain return operation are depicted in FIG. 5B. With reference to FIG. 5B, after the called program has finished processing it issues the cross-domain return instruction 13 (step 70). In response, the central processor unit first retrieves the address space descriptor from field 26 in the cross-domain stack frame 21 associated with the calling program's domain 11 and loads it into the appropriate central processor unit registers to initiate a change from the address space of the called domain 11 to the address space of the calling domain 10 (step 71). In the address space change, the central processor unit also invalidates the contents of the processor's translation buffer. The central processor unit also retrieves the return clear mask from field 35 (FIG. 3A) of the cross-domain stack frame 21 associated with the domain 10 of the calling program and clears the central processor unit's general purpose registers identified thereby (step 72).

Following step 72, using the save register mask in field 34, the central processor unit restores to the appropriate general purpose registers the contents of field 32 of the cross-domain stack frame 21 associated with the domain 10 of the calling program (step 73). The central processor unit then tests the return clear flag in field 27 in the stack frame 21 associated with the domain 10 of the called program (step 74). If the return clear flag is set, the return entry code 17 clears the received capability argument field 24 in the cross-domain stack frame 21 associated with the domain of programs called by the called program (step 75). Following step 75, or following step 74 if the central processor unit determines in step 74 that the return clear flag 27 is clear, the central processor unit sequences to step 76 in which the central processor unit retrieves the processor status word, program counter, and stack pointers from fields 30, 31 and 33 in the cross-domain stack frame 21 associated with the domain 10 of the calling program and loads them into appropriate registers in the central processor unit to return control to the calling program in domain 10.

It will be appreciated that the system provides several advantages in connection with cross-domain call and return operations. First, using the PASSARG pass argument instruction the calling program can control the return clear flag 27 to enable clearing of the capability argument which is passed to the called program in field 24 of the cross-domain stack frame 21 associated with the domain 11 of called program. The security of the capability argument is effectively maintained by the PASSARG pass argument instruction, which reduces the amount of clearing necessary on a return operation.

In addition, the use of the save, call clear and return clear register masks in fields 41 through 43 of and entry 40 in the cross-domain link table 25 facilitates saving, clearing and/or restoration of only those registers which require saving, clearing and/or restoration during the cross-domain call and return operation. This also can reduces the amount of time required to perform these operations.

Furthermore, experiments performed in connection with one prior capability system [specifically the Cambridge Capability System (CAP-I)] have shown that during most cross-domain call operations, zero or only one capability have been passed, and that most arguments can be passed in registers. The new cross-domain call system, by providing a field 24 in the cross-domain stack frame 21 for transferring one capability, thus satisfies most cross-domain call operations, and by allowing the contents of field 24 to point to a segment of capabilities it satisfies the remainder of the cross-domain call operations in which more than one capability is passed. This has two implications. First, although the MAPARG map argument instruction and PASSARG pass argument instruction have been described in the system depicted in FIGS. 1 through 5B as being executed directly by central processor unit hardware or microcode, since they are not often used they may comprise operating system calls without substantially adversely effecting performance of the cross-domain call operation. Second, since only one field 24 need be provided for passing the capability or capability segment, security is simplified, since only that field 24 need be cleared to ensure that the capability is not available to other domains.

Figure 6:
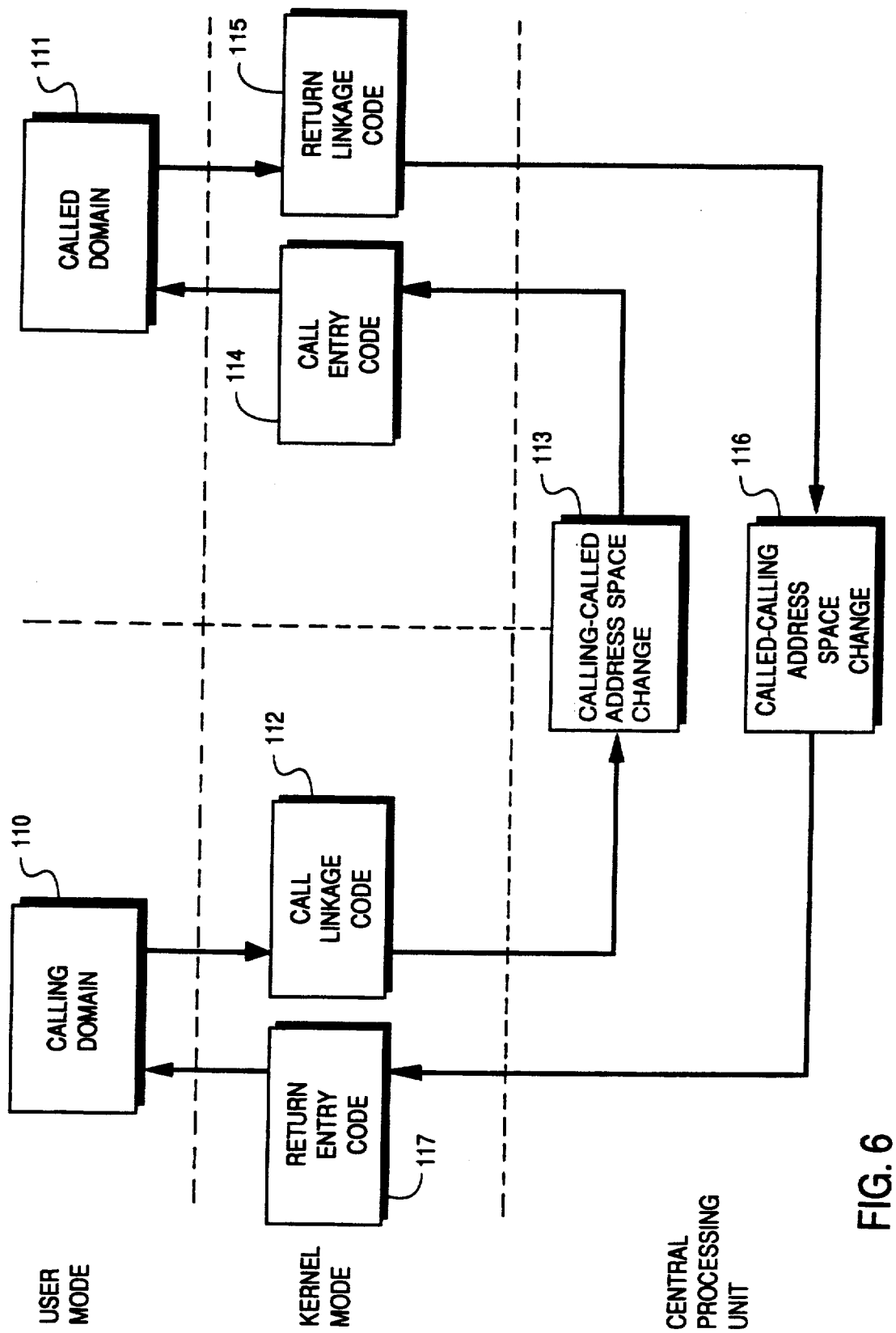
FIG. 6 is a general block diagram of a second embodiment of the invention.

The embodiment described in connection with FIGS. 1 through 5B is particularly useful ,in connection with a "CISC", or "complex instruction set computer". The embodiment described below in connection with FIGS. 6 through 7B is particularly useful in connection with a "RISC", or "reduced instruction set computer" which is generally characterized by a relatively small number of instructions, typically less than one hundred instructions, and all references to memory are through a load instruction, in which data is retrieved from memory, and a store instruction, in which data is stored in memory. RISC computers also tend not to be microprogrammed.

The digital data processing system depicted in FIG. 6 also operates in two hierarchical protection modes, namely a user mode and a kernel mode. Prior to initiating the cross-domain call operation, the program in the calling domain 110 may issue a PASSARG pass argument instruction, which operates as a trap to a code sequence which is executed in kernel mode. The calling program issues the PASSARG pass argument instruction generally as described above in connection with the system depicted in FIGS. 1 through 5B, that is, (a) if it needs to pass a capability to the program which it is calling in a called domain 111, or (b) if it has previously passed a capability, but it is not passing one during this cross-domain call operation. The program in the calling domain 110 does not issue a PASSARG pass argument instruction if it is not passing a capability during a cross-domain call operation and it has not previously initiated cross-domain call operations in which capabilities have been passed.

To accomplish the call operation, the program in the calling domain 110 enables call linkage code 112 which is processed by the central processor unit while in the kernel mode. The call linkage code 112, in turn, initiates an address space change 113 in the central processor unit logic hardware to enable the central processor unit to perform virtual-to-physical address translation while processing programs in the called domain. After the address space change 113, call entry code 114 is enabled to finally pass control to the called program in the called domain 111. The call entry code 114 is also processed by the central processor unit while in the kernel mode. The central processor unit processes programs in the called domain while in the user mode. To use a capability passed by the program in the calling domain 110, the program in the called domain 111 issues the MAPARG map argument instruction as described above in connection with FIG. 1.

At some point later, a program in the called domain initiates a return operation. In the return operation, the called domain 111 enables the operating system to initiate processing of return linkage code 115. The central processor unit processes return linkage code 115 in the kernel mode. The return linkage code 115 initiates an address space change 116 in the central processor unit logic hardware to enable the central processor unit to perform virtual-to-physical address translation while processing programs in the calling domain. After the address space change 116, return entry code 117 is enabled to finally pass control to the calling program in the calling domain 1110. The return entry code 117 is also processed by the central processor unit while in the kernel mode. The central processor unit processes programs in the calling domain while in the user mode.

The system depicted in FIG. 6 uses the cross-domain stack 20 described above in connection with FIG. 2B, including cross-domain stack frames 21 generally depicted in FIG. 3A, with several modifications as described below. The system does not include a cross-domain link table 25 (FIG. 3B). The system depicted in FIG. 6 does include a domain control block 50 (FIG. 3C) for each called domain, but the domain control block does not include a cross-domain link table pointer. The system depicted in FIG. 6 includes explicit instructions for saving, clearing and restoring each of the central processor unit's general purpose registers to be saved, cleared and restored, and so a cross-domain stack frame 21 does not include mask fields 34 or 35. Since there is no cross-domain link table, the cross-domain stack frame 21 does not include pointer field 23. The cross-domain stack frames 21 of a cross-domain stack 20 do have a field in which the address of the return linkage code 115 may be stored, as described below in connection with FIG. 7A.

The cross-domain stack frames 21 used in connection with the system depicted in FIG. 6 also differ from the system described in connection with FIG. 1 in that it does not have a return clear flag 27. Instead, the return linkage code 115 (FIG. 6) used in the cross-domain return operation includes a code sequence which overwrites or clears the received capability argument field 24 in the appropriate cross-domain stack frame 21 during the return, and a second code sequence which does not clear the field 24 if the field need not be cleared during the return. The determination of whether the code sequence to clear the received capability argument field 24 is to be patched in and executed is made during the execution of the PASSARG pass argument instruction, which patches the appropriate code sequence into the return linkage code 115 which is used the when the calling program returns to a program in another domain which called it.

Specifically, initially the return linkage code 115, which is used to enable the program in the calling domain 110 to return to a program which called it, is patched so that the received capability argument field 24 of the cross-domain stack frame 21 associated with the called domain 111 is not cleared. During execution of a PASSARG pass argument instruction to pass a capability, the code sequence to clear the received capability argument field 24 of the cross-domain stack frame 21 associated with the called domain 111 is patched into the return linkage code to facilitate a clearing of the field when the calling program returns to a program which called it. If PASSARG pass argument instruction which has a null operand, indicating no capability is being passed, is thereafter executed, the received capability argument field 24 of the cross-domain stack frame 21 associated with the called domain 111 is cleared, as described above in connection with the system depicted in FIGS. 1 through 5B. In addition, the second code sequence, which does not enable clearing of the field 24, is patched into the return linkage code 115 used by the program in the calling domain 110 to initiate a cross-domain return operation.

Figure 7A:
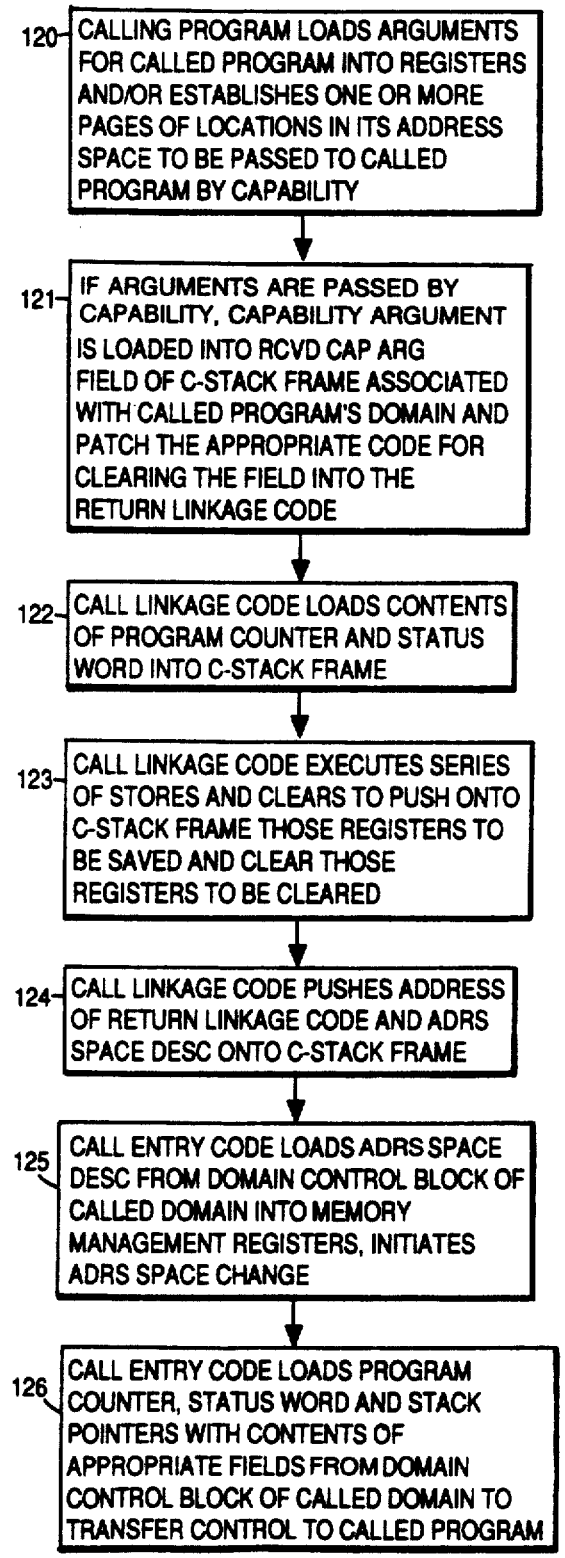
FIGS. 7A and 7B are flow diagrams depicting the operations of the system depicted in FIG. 6.
Figure 7B:
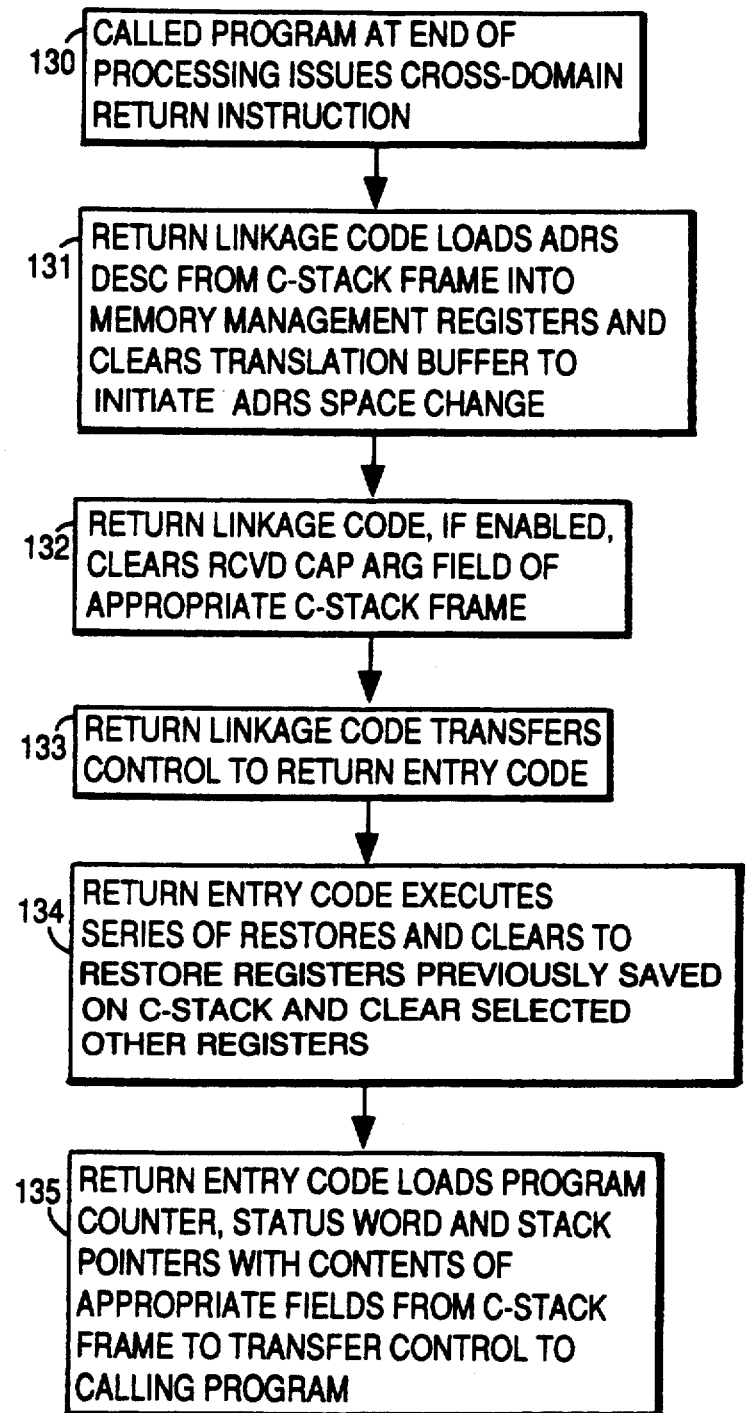

The specific operations performed by the system depicted in FIG. 6 in connection with a cross-domain call operation are depicted in FIG. 7A, and the operations performed in connection with a cross-domain return operation are depicted in FIG. 7B. With reference to FIG. 7A, the calling program, in calling domain 110, first establishes the arguments to be passed to the called program, in called domain 111. If arguments are to be passed in the processor registers, the calling program loads them into the appropriate registers (step 120). If arguments are to be passed by capability, the calling program issues the PASSARG instruction to load the capability in the received capability argument field 24 of the cross-domain stack frame associated with the called domain 111 and patch the appropriate code for clearing the field 24 into the return linkage code 115 executed by a program in the calling domain 110 when it returns to a program which called it (step 121).

It will be appreciated that, if an argument has been previously passed by way of capability, but no capability is being passed during this cross-domain call operation, the calling program issues the PASSARG pass argument instruction with a null operand, and, instead of performing step 121, the system overwrites or clears the contents of the received capability argument field 24 of the cross-domain stack frame 21 associated with the called domain 111 and patches the code sequence which does not clear field 24 into the return linkage code 115 executed by a program in the calling domain 110 when it returns to a program which called it.

Thereafter, the calling program issues a call instruction, including as an operand a pointer to the call linkage code 112. In executing the call instruction, the central processor unit traps to the call linkage code 112, which is executed in kernel mode. The call linkage code 112 loads the contents of the central processor unit's program counter and status word into the cross-domain stack frame 21 associated with the calling domain (step 122). The call linkage code 112 then executes a series of stores and clears to push onto the cross-domain stack frame 21 associated with the calling domain 110 to save those general purpose registers which are to be saved and clear those that are to be cleared, as depicted in FIGS. 4A and 4B (step 123). The call linkage code 112 then pushes the address of the return linkage code 115 and the address space descriptor of the calling domain 110 onto the cross-domain stack frame 21 associated with the calling domain 110 (step 124) and sequences to the call entry code 114.

The call entry code 114 contains the address of the domain control block 50. Using the address, the call entry code 114 obtains from the domain control block 50 the address space descriptor from field 53 (FIG. 3C) and loads it into the memory management registers in the central processor unit to initiate the address space change 113 (step 125). In addition, the call entry code 114 invalidates the contents of the central processor unit's translation buffer. The call entry code 126 then loads the program counter, status word and stack pointers with the contents of the corresponding fields in the domain control block 50 to transfer control to the program in the called domain 111.

At some point later, after the program in the called domain 111 has finished processing, it issues a cross-domain return instruction to initiate a return of control to a program in the calling domain 110 (step 130, FIG. 7B). Prior to issuing the cross-domain return operation, the program has loaded the results of processing, namely the output arguments to be transferred to the program in the calling domain 110, into processor registers or portions of the address space identified by the capability. When the cross-domain return instruction is issued, control is passed to the return linkage code 115 whose address is contained in the cross-domain stack frame 21 associated with the calling domain 110.

The return linkage code 115 first retrieves the address descriptor from the cross-domain stack frame 21 associated with the calling domain 110 and loads it into the central processor unit's memory management registers and clears the translation buffer to initiate the address space change 116 (step 131). If the appropriate code sequence has been patched in, the return linkage code 115 also clears the received capability argument field 24 of the appropriate cross-domain stack frame 21. This will occur if the called domain 111 had, during its processing another domain and passed arguments by way of a capability which had not been previously cleared. If the appropriate code sequence has been patched in, the received capability argument field 24 of the cross-domain stack frame associated with the domain called by called domain 111 will be cleared (step 132). The return linkage code 115 then transfers control to return entry code 117 (step 133).

The return entry code 117 first executes a series of instructions to restore those of the general purpose registers to be restored and clear those of the general purpose registers to be cleared during the cross-domain return operation, as depicted in FIG. 4B (step 134). The return entry code then loads the central processor unit's program counter, status word and stack pointers with the contents of appropriate fields from the cross-domain stack frame 21 associated with the calling domain 110 to transfer control to the calling program in calling domain 110.

The save register, call clear and return clear masks in fields 41, 42 and 43 of the cross-domain link table 25 (FIG. 3B) used in connection with the system depicted in FIGS. 1 through 5B, and the call linkage code 112, call entry code 114, return linkage code 115 and return entry code 117 used in connection with the system depicted in FIGS. 6 through 7B are preferably generated by a cross-domain linker which is used to link programs in the diverse domains in the respective systems. The cross-domain linker is provided by the operating system and thus trusted to perform the linking operations to generate the masks, in the case of the system depicted in FIGS. 1 through 5B, or code, in the case of the system depicted in FIGS. 6 through 7B, which enable the appropriate registers to be saved and cleared, and the received capability argument field 24 to be cleared.

In particular, the compiler generates and stores in its object file, along with the code to be linked, information which indicates the usage of the variables in the program. The linker, when it links the program in the calling domain 10 and the program in the called domain 11, allocates variables to registers, using the usage information provided by the compiler. In addition, after variables have been allocated to registers, the linker, using the security and integrity information depicted in FIGS. 4A and 4B, and trustworthiness (that is, security and integrity) information provided by an operator or security officer, generates the save register mask, the call clear mask and return clear mask for fields 41 through 43 in the cross-domain link table 25, in the case of the cross-domain call system depicted in FIGS. 1 through 5B, or the sequence of instructions to save, clear and restore registers in the case of the cross-domain call operation depicted in FIGS. 6 through 7B.

In this operation, the linker identifies (1) the registers that are allocated to variables of the calling program at the point at which a cross-domain call or return operation is to occur, and (2) the registers that are allocated to variables of the called program. The linker then identifies the ones of the registers which contain variables of the calling program that have already been written to memory at the point at which the cross-domain call operation is to occur, since those registers do not have to be saved. The registers that contain variables in the calling program that have not been written to memory must be saved if those variables are used in the calling program after the cross-domain return operation. Based on all of this information, the trustworthiness information from the operator or security officer, and the information depicted in FIGS. 4A and 4B, the linker generates the masks, for the system depicted in FIGS. 1 through 5B, or code sequences, for the system depicted in FIGS. 6 through 7B.

Since the linker determines which registers need to be saved, restored and cleared on each cross-domain call and return operation, and generates the masks, or instruction sequences, to enable the save, restore and clear, the central processor unit saves, restored and clears only the registers which need to be saved, restored and cleared, and not all of the registers, which can reduce the time required to perform the cross-domain call and return operations.

It will be appreciated that the invention provides a system which speedily performs cross-domain call and return operations by ensuring that only the registers which require saving, clearing and restoring are, in fact, saved, cleared and restored. In addition, the invention ensures the security of the capability or capabilities passed during the cross-domain call operation, but does so in a manner so that the capabilities are cleared only when necessary, that is, only when there is a cross-domain call or return operation in which the capabilities have not been overwritten, reducing the time required for the cross-domain call or return operations.

It will further be appreciated that, although the systems depicted in FIGS. 1 through 5B and FIGS. 6 through 7B have been described as passing only one capability in the received capability argument field 24 in the cross-domain stack frame 21, multiple capabilities may be passed in the field. In that case, the cross-domain stack frame 21 may be provided with a return clear flag 27 which is associated with all of the capabilities which may be passed in the field 24, or multiple return clear flags 27 each of which may be associated with one or several capabilities. If multiple return clear flags 27 are provided the operations to clear the capabilities, either during execution of a PASSARG pass argument instruction with a null argument or during a cross-domain return operation, may be individually performed as described above in connection with each of the return clear flags and the capabilities associated therewith.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. In a digital data processing system including a calling program and an associated first domain and a called program and an associated second domain, a cross-domain transfer system comprising:
  A. cross-domain stack means having a plurality of stack frames including a stack frame that corresponds to said first domain and a stack frame that corresponds to said second domain, each stack frame having a return clear flag;
  B. cross-domain call means including:
    i. capability generating means associated with said calling program for selectively generating a capability for transmission to said called program, said capability identifying information to be used by the called program, and, if a capability is generated, for storing said capability in the stack frame that corresponds to said second domain of said called program during a cross-domain call operation;
    ii. return clear flag condition establishment means responsive to said capability generating means for selectively conditioning the return clear flag in the stack frame that corresponds to said first domain of said calling program to a condition that indicates whether said capability is to be erased from said stack frame that corresponds to said second domain; and
  C. cross-domain return means associated with said called program for erasing or not erasing said capability from said stack frame that corresponds to said second domain in response to said condition of the return clear flag in said stack frame that corresponds to said first domain of said calling program during a cross-domain return operation.

2. A cross-domain transfer system as defined in claim 1 wherein said digital data processing system includes means for storing values that define a state of said digital data processing system, said cross-domain call means further including means for storing said values in said stack frame that corresponds to said first domain of said calling program during said cross-domain call operation.

3. A cross-domain transfer system as defined in claim 2 wherein said cross-domain return means includes means for retrieving said values from said stack frame that corresponds to said first domain of said calling program during a cross-domain return operation.

4. A cross-domain transfer system as defined in claim 1 wherein said digital data processing system includes a plurality of registers for storing values, said cross-domain call means including register save means for saving the values in said registers in said stack frame that corresponds to said first domain of said calling program during a cross-domain call operation.

5. A cross-domain transfer system as defined in claim 4 wherein said register save means saves values of selected ones of said registers.

6. A cross-domain transfer system as defined in claim 5 further including save mask means for identifying the selected registers whose values are to be saved, said register save means using the mask means in its saving of the selected registers.

7. A cross-domain transfer system as defined in claim 6 wherein said register save means further saves said save mask means in said stack frame that corresponds to said first domain of said calling program.

8. A cross-domain transfer system as defined in claim 6 wherein said cross-domain return means includes register restore means responsive to said save mask means and the values saved by said save register means for retrieving said values from said stack frame that corresponds to said first domain of said calling program and saving said values in said plurality of registers.

9. A cross-domain transfer system as defined in claim 6 further comprising save register mask generating means responsive to said calling program and said called program for generating said save register mask means.

10. A cross-domain transfer system as defined in claim 9 wherein said calling program and said called program use at least one of said registers and said save register mask generating means includes:
A. calling program inspection means for identifying said registers that are in use by said calling program;
B. called program inspection means for identifying said registers that are in use by said called program;
C. mask generation means for generating said save register mask means based at least in part on said registers identified by said calling program inspection means and by said called program inspection means.

11. A cross-domain transfer system as defined in claim 10 wherein said calling program nd said called program further have an associated trust rating, said mask generation means generating said register save means based at least in part on said trust rating.

12. A cross-domain transfer system as defined in claim 5 wherein said register save means includes means for saving each of the selected registers in said stack frame that corresponds to said first domain of said calling program.

13. A cross-domain transfer system as defined in claim 12 wherein said cross-domain return means includes register restore means for restoring each of the selected registers by retrieving the values saved by said register save means in said stack frame that corresponds to said first domain of said calling program and storing said values in said registers.

14. A cross-domain transfer system as defined in claim 12 further comprising means responsive to said calling program and said called program for saving said registers.

15. A cross-domain transfer system as defined in claim 14 wherein said calling program and said called program user at least one of said registers and said save registers means includes:
A. calling program inspection means for identifying said registers that are in use by said calling program;
B. called program inspection means for identifying said registers that are in use by said called program;
C. means for saving at least of one of said registers identified by said calling program inspection means and said called program inspection means in said stack frame that corresponds to said first domain of said calling program.

16. A cross-domain transfer system as defined in claim 15 wherein said digital data processing system includes a plurality of registers for storing values, said cross-domain call means including call clear means for clearing said registers during a cross-domain call operation.

17. A cross-domain transfer system as defined in claim 16 wherein said calling program and said called program further have an associated trust rating, said system generating said register save means based at least in part on said trust rating.

18. A cross-domain transfer system as defined in claim 16 wherein said call clear means clears selected ones of said registers.

19. A cross-domain transfer system as defined in claim 18 further including call clear mask means for identifying the selected registers to be cleared, said call clear means using the call clear mask means in its clearing of the selected registers.

20. A cross-domain transfer system as defined in claim 19 further comprising call clear mask generating means responsive to said calling program and said called program for generating said call clear mask means.

21. A cross-domain transfer system as defined in claim 20 wherein said calling program and said called program use at least one of said registers and said call clear mask generating means includes:
A. calling program inspection means for identifying said registers that are in use by said calling program;
B. called program inspection means for identifying said registers that are in use by said calling program;
C. mask generation means for generating said call clear mask means based at least in part on said registers identified by said called program inspection means and said called program inspection means.

22. A cross-domain transfer system as defined in claim 21 wherein said calling program and said called program further have an associated trust rating, said mask generation means generating said call clear mask means based at least in part on said trust rating.

23. A cross-domain transfer system as defined in claim 16 wherein said call clear means includes call means for clearing said selected registers.

24. A cross-domain transfer system as defined in claim 23 wherein said call clear means is responsive to said calling program and said called program for clearing said selected registers.

25. A cross-domain transfer system as defined in claim 24 wherein said calling program and said called program use at least one of said registers and said call clear means further includes:
A. calling program inspection means for identifying said registers that are in use by said calling program;
B. called program inspection means for identifying said registers that are in use by said called program;
C. means for clearing at least one of said registers.

26. A cross-domain transfer system as defined in claim 25 wherein said calling program and said called program further have an associated trust rating, said means for clearing said registers clearing said at least one of said registers based at least in part on said trust rating.

27. A cross-domain transfer system as defined in claim 1 wherein said digital data processing system includes a plurality of registers for storing values, said cross-domain return means including return clear means for clearing said registers during said cross-domain return operation.

28. A cross-domain transfer system as defined in claim 27 wherein said return clear means clears selected ones of said registers during said cross-domain return operation.

29. A cross-domain transfer system as defined in claim 28 further including return clear mask means for identifying the selected registers to be cleared, said return clear means using the return clear mask means in its clearing of the selected registers.

30. A cross-domain transfer system as defined in claim 29 in which said cross-domain call means includes means for saving said return clear mask means in said cross-domain stack frame that corresponds to said first domain of said calling program during a cross-domain call operation, said return clear means retrieving said return clear mask means from said cross-domain stack frame that corresponds to said first domain of said calling program during said cross-domain return operation.

31. A cross-domain transfer system as defined in claim 30 further comprising return clear mask generating means responsive to said calling program and said called program for generating said return clear mask means.

32. A cross-domain transfer system as defined in claim 31 wherein said calling program and said called program use at least one of said registers and said return clear mask generating means includes:
   A. calling program inspection means for identifying said registers that are in use by said calling program;
   B. called program inspection means for identifying said registers that are in use by said called program;
   C. mask generation means for generating said return clear mask means based at least in part on said trust rating and based at least in part on said registers identified by said calling program inspection means and said called program inspection means.

33. A cross-domain transfer system as defined in claim 32 wherein said calling program and said called program further have an associated trust rating, said mask generation means generating said clear mask means based at least in part on said trust rating.

34. A cross-domain transfer system as defined in claim 28 wherein said return clear means includes means for clearing said selected registers during said cross-domain return operation.

35. A cross-domain transfer system as defined in claim 34 further comprising means responsive to said calling program and said called program for clearing said selected registers during said cross-domain return operation.

36. A cross-domain transfer system as defined in claim 35 wherein said calling and said called program use at least one of said registers and said return clear means includes:
   A. calling program inspection means for identifying said registers that are in use by said calling program;
   B. called program inspection means for identifying said registers that are in use by said called program;
   C. means for clearing said selected registers during said cross-domain return operation.

37. A cross-domain transfer system as defined in claim 36 wherein said calling program and said called program further have an associated trust rating, said return clear means clearing said selected registers during said cross-domain return operation based at least in part on said trust rating.

38. A cross-domain transfer system as defined in claim 1 wherein the domain of said calling program and the domain of said called program are each related to an address space defined by an address space descriptor means, said digital data processing system further including address space utilization means for using an address space descriptor means during processing,
   A. said cross-domain call means including calling address space conditioning means for performing an address space change operation in connection with said address space utilization means from the address space of the domain of said calling program to the address space of the called program during a cross-domain call operation to facilitate usage by said digital data processing system of said address space descriptor means of said called program; and
   B. said cross-domain return means including return address space conditioning means for performing an address space change operation in connection with said address space utilization means from the address space of the calling program during a cross-domain return operation to facilitate usage by said digital data processing system of said address space descriptor means of said calling program.

39. A cross-domain transfer system as defined in claim 1 wherein said digital data processing system includes means for storing state information defining a state for said digital data processing system, and control block means for storing state information for the called domain, said cross-domain call means further including:
   A. calling domain state saving means for saving said state information in said stack frame that corresponds to said first domain of said calling program during a cross-domain call operation; and
   B. called domain state establishment means responsive to the operation of said calling domain state saving means for retrieving the state information from said control block means and storing it in said means for storing state information during a cross-domain call operation to thereby establish the state of said digital data processing system for said called domain.

40. A cross-domain transfer system as defined in claim 39 wherein said cross-domain return means includes calling domain state restoration means for retrieving state information from said stack frame that corresponds to said first domain of said calling program and that was previously saved in said stack frame by said calling domain state savings means, and storing it in said means for storing state information during a cross-domain return operation to thereby establish the state of said digital data processing system for said calling domain.

41. A cross-domain transfer system as defined in claim 1 wherein said digital data processing system includes a plurality of register means for storing information during processing, and link table means including a save register mask and a call clear mask each identifying selected ones of said register means, said cross-domain call means further including:
   calling domain register saving means for saving the contents of the register means identified by said save register mask in said stack frame that corresponds to said second domain of said called program during a cross-domain call operation; and B. calling domain register clear means responsive to the operation of said calling domain register saving means for clearing the contents of the register means identified by said call clear mask.

42. A cross-domain transfer system as defined in claim 41 wherein said cross-domain call means further includes means for saving said cave register mask in said stack frame that corresponds to said second domain of said called program during a cross-domain call operation.

43. A cross-domain transfer system as defined in claim 42 wherein said cross-domain return means includes:
   A. save register mask retrieval means for retrieving the save register mask from said stack frame that corresponds to said second domain of said called program during a cross-domain return operation; and
   B. register restoration means responsive to the retrieved save register mask for restoring the contents of the registers identified by said retrieved save register mask.

44. A cross-domain transfer system as defined in claim 41 wherein said link table means further includes a return clear mask identifying selected ones of said register means, said cross-domain return means further including called domain register clear means for clearing the contents of the register means identified by said return clear mask during a cross-domain return operation.

45. A cross-domain transfer system as defined in claim 44 wherein said cross-domain call means further includes means for saving the return clear mask from said link table means in said stack frame that corresponds to said second domain of said called program during a cross-domain call operation, said cross-domain return means including means for retrieving said return clear mask from said stack frame and using the retrieved return clear mask in its clearing operation.

46. A cross-domain transfer system as defined in claim 41 wherein said digital data processing system including means for storing state information defining a state for said digital data processing system, and control block means for storing state information for the called domain, and wherein said link table means further includes control block pointer means for identifying a control block, said cross-domain call means further including:
   A. calling domain state saving means for saving the contents of said means for storing state information in said stack frame that corresponds to said first domain of said calling program during a cross-domain call operation; and
   B. called domain state establishment means responsive to the operation of said calling domain state saving means for retrieving the state information from said control block means and storing it in said means for storing state information during a cross-domain call operation to thereby establish the state of said digital data processing system for said called domain.

47. A cross-domain transfer system as defined in claim 46 wherein said cross-domain return means includes calling domain state restoration means for retrieving the previously-saved state information from said stack frame that corresponds to said first domain of said calling program and storing it in said means for storing state information during a cross-domain return operation to thereby establish the state of said digital data processing system for said calling domain.

48. A cross-domain transfer system as defined in claim 1 wherein said cross-domain call means further includes capability establishment means responsive to said capability generating means for establishing the condition of a previously-generated capability in said stack frame that corresponds to said second domain of said called program if said capability generating means does not generate a capability during a cross-domain call operation.

49. In a digital data processing system including a calling program and an associated domain, a called program and an associated domain, and a plurality of registers, a cross-domain transfer system comprising:
   A. cross-domain stack means having a plurality of stack frames including a stack frame that corresponds to said domain of said calling program;
   B. means for identifying a subset of said registers having contents that are to be unavailable to said called program, access to said means for identifying being restricted to that said calling program and said called program cannot change said subset;
   C. cross-domain call means associated with said calling program including means for saving the contents of said subset of said registers in said stack frame that corresponds to said domain of said calling program and clearing said subset of said registers during a cross-domain call operation to said called program;
   D. cross-domain return means for retrieving the contents of said subset of registers which were previously saved by said cross-domain call means in said stack frame during a cross-domain return operation from said called program to said calling program and restoring said contents in said registers.

50. In a digital processing system including a calling program and an associate domain and a called program and an associated domain, and a plurality of registers available for use by said calling program and said called program, linkage means comprising:
   A. calling program inspection means for identifying said registers that are used by said calling program;
   B. called program inspection means for identifying said registers that are used by said called program;
   C. linkage information generation means responsive to identification of said registers by said calling program inspection means and said called program inspection means for generating linkage information that identifies registers having contents that will be changed when said calling program calls said called program, access to said linkage information being restricted so that said calling and said called programs cannot change said linkage information; and
   D. means for providing said linkage information to said calling program and said called program during cross-domain transfers and causing the contents of only said identified registers to be saved during said call, whereby other registers having contents that will not be changed during said call are not saved.

51. In a digital data processing system including a calling program and an associated domain and a called program and an associated domain, and a plurality of registers available for use by said calling program and said called program, linkage means comprising:

A. calling program inspection means for identifying said registers that are used by said calling program;
B. called program inspection means for identifying said registers that are used by said called program;
C. linkage information generation means responsive to identification of said registers by said called program inspection means and said called program inspection means for generating linkage information that identifies registers having contents that will be changed when said calling program calls said called program, access to said linkage information being restricted so that said calling and said called programs cannot change said linkage information; and
D. means for providing said linkage information to said calling program and said called program during cross-domain transfers and causing the contents of only said identified registers to be saved during said call, whereby other registers having contents that will not be changed during said call are not saved;

wherein said calling program and said called program further have an associated trust rating, said linkage means generating said linkage information based at least in part on said trust rating so that said identified registers also include registers having contents that are to be unavailable to said called program during a cross-domain transfer from said calling program, said means for providing clearing the contents of said registers to be made unavailable during said call.

* * * * *

UNITED STATES PATENT AND TRADEMARK OFFICE
CERTIFICATE OF CORRECTION

PATENT NO. : 5,210,874

DATED : May 11, 1993

INVENTOR(S) : Paul A. Karger

It is certified that error appears in the above-identified patent and that said Letters Patent is hereby corrected as shown below:

Col. 3, line 44, "s" should be --is--;
     line 44, delete "," after "of".

Col. 8, line 11, "t" should be --to--.

Col. 11, line 26, "addition" should be --additional--.

Col. 21, line 32, "nd" should be --and--.

Col. 25, line 7, "cave" should be --save--.

Col. 26, line 39, "associate" should be --associated--.

Signed and Sealed this

Second Day of May, 1995

BRUCE LEHMAN

*Attest:*

*Attesting Officer*     *Commissioner of Patents and Trademarks*